United States Patent
Feblowitz et al.

(10) Patent No.: US 7,882,485 B2
(45) Date of Patent: Feb. 1, 2011

(54) METHOD FOR MODELING COMPONENTS OF AN INFORMATION PROCESSING APPLICATION USING SEMANTIC GRAPH TRANSFORMATIONS

(75) Inventors: Mark D. Feblowitz, Winchester, MA (US); Zhen Liu, Tarrytown, NY (US); Anand Ranganathan, White Plains, NY (US); Anton V. Riabov, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 11/695,311

(22) Filed: Apr. 2, 2007

(65) Prior Publication Data

US 2008/0243450 A1    Oct. 2, 2008

(51) Int. Cl.
*G06F 9/44* (2006.01)
(52) U.S. Cl. ............... 717/104; 717/120; 717/126; 717/136; 717/139
(58) Field of Classification Search .......... 717/104
See application file for complete search history.

(56) References Cited

U.S. PATENT DOCUMENTS

| | | | |
|---|---|---|---|
| 5,675,786 A | 10/1997 | McKee et al. | |
| 2004/0073545 A1 | 4/2004 | Greenblatt et al. | |
| 2004/0138936 A1 | 7/2004 | Johnson et al. | |
| 2005/0021548 A1 | 1/2005 | Bohannon et al. | |
| 2006/0212855 A1 | 9/2006 | Bournas et al. | |
| 2007/0023515 A1 | 2/2007 | Urken | |
| 2007/0156430 A1* | 7/2007 | Kaetker et al. | 705/1 |
| 2007/0162893 A1* | 7/2007 | Moosmann et al. | 717/121 |
| 2007/0168303 A1* | 7/2007 | Moosmann et al. | 705/400 |
| 2007/0174811 A1* | 7/2007 | Kaetker et al. | 717/104 |
| 2007/0186209 A1* | 8/2007 | Kaetker et al. | 717/104 |
| 2007/0198971 A1 | 8/2007 | Dasu et al. | |
| 2007/0220046 A1* | 9/2007 | Moosmann et al. | 707/104.1 |
| 2007/0265862 A1* | 11/2007 | Freund et al. | 705/1 |
| 2008/0120129 A1 | 5/2008 | Seubert et al. | |
| 2008/0243449 A1 | 10/2008 | Feblowitz et al. | |
| 2008/0250390 A1 | 10/2008 | Feblowitz et al. | |

(Continued)

OTHER PUBLICATIONS

M. Sullivan. Tribeca: A stream database manager for network traffic analysis. In Proc. of the 22nd Intl. Conf. on Very Large Data Bases, Sep. 1996.

(Continued)

*Primary Examiner*—Thomas K Pham
(74) *Attorney, Agent, or Firm*—F. Chau & Associates, LLC

(57) ABSTRACT

A method for modeling a component of an information processing application, includes: defining an applicability condition of a component, wherein the applicability conditions includes variables representing objects that must be included in a pre-inclusion state and a graph pattern that semantically describes the objects that must be included in the pre-inclusion state, wherein the pre-inclusion state is a state against which the applicability of the component for inclusion in a processing graph is evaluated; and defining an inclusion effect of the component, wherein the inclusion effect includes variables representing objects that must be included in a post-inclusion state and a graph pattern that semantically describes the objects that must be in the post-inclusion state, wherein the post-inclusion state is a state resulting from inclusion of the component in the processing graph.

23 Claims, 9 Drawing Sheets

U.S. PATENT DOCUMENTS

2008/0288595 A1 11/2008 Liu et al.
2010/0191521 A1 7/2010 Huet et al.

OTHER PUBLICATIONS

M. LeLarge, Z. Liu, and A. Riabov. Automatic composition of secure workflows. In ATC-06, 2006.
J. Ambite and C. Knoblock. Flexible and scalable query planning in distributed and heterogeneous environments. In AIPS'98, Jun. 1998.
H.Wang and C. Zaniolo: ATLaS: A Native Extension of SQL for Data Mining and Stream Computations, UCLA CS Dept., Technical Report, Aug. 2002.
M. A. Hammad, W. G. Aref, and A. K. Elmagarmid. Stream window join: Tracking moving objects in sensor-network databases. In Proc. of the 15th SSDBM Conference, Jul. 2003.
C. Cranor et al. Gigascope: A stream database for network applications. In SIGMOD, 2003.
S. Chandrasekaran et al. TelegraphCQ: Continuous Dataflow Processing for an Uncertain World. CIDR, 2003.
D. J. Abadi, et al: Aurora: a new model and architecture for data stream management. VLDB J. 12(2): 120-139 (2003).
Sheshagiri, M., desJardins, M., Finin, T.: A planner for composing services described in DAML-S. In: Web Services and Agent-based Engineering—AAMAS'03.
L'Ecu'E, F., L'Eger, A.: A formal model for semantic web service composition. In: ISWC. (2006).
Sirin, E., Parsia, B.: Planning for Semantic Web Services. In: Semantic Web Services Workshop at 3rd ISWC.
B. Parsia and E. Sirin. Pellet: An OWL DL reasoner. In The Semantic Web—ISWC 2004, 2004.
N. Jain et al. Design, Implementation, and evaluation of the linear road benchmark on the stream processing core. In SIGMOD'06, Jun. 2006.
A. Riabov, Z. Liu, Planning for Stream Processing Systems, In Proceedings of AAAI-2005, Jul. 2005.
Y. Gil., E. Deelman, J. Blythe, C. Kesselman, and H. Tangmunarunkit. Artificial intelligence and grids: Workflow planning and beyond. IEEE Intelligent Systems, Jan. 2004.
D. B. Terry et al. Continuous queries over append-only databases. In SIGMOD, pp. 321-330,1992.
C-N. Hsu and C. A. Knoblock Semantic query optimization for query plans of heterogeneous multi-database systems, IEEE Transactions on Knowledge and Data Engineering, 12(6):959-976, Nov./Dec. 2000.
R. Ginis, R. Strom: An Autonomic Messaging Middleware with Stateful Stream Transformation, Proceedings of the International Conference on Autonomic Computing (ICAC'04).
A. Arasu, S. Babu, J. Widom. The CQL continuous query language: Semantic foundations and query execution. Technical Report 2003-67, Stanford University, 2003.
D.J. Abadi et al. The Design of the Borealis Stream Processing Engine (CIDR), Jan. 2005, Asilomar, CA.
Traverso, P., Pistore, M.: Automated composition of semantic web services into executable processes. In: ISWC. (2004).
Narayanan, S., McIlraith, S.: Simulation, verification and automated composition of web services. In: WWW. (2002).
Heflin, J., Munoz-Avila, H.: Low-based agent planning for the semantic web. In: Ontologies and the Semantic Web, 2002 AAAI Workshop.
Zhou, J., Ma, L., Liu, Q., Zhang, L., Yu, Y., Pan, Y.: Minerva: A scalable OWL ontology storage and inference system. In: 1st Asian Semantic Web Symp. (2004).
H. Knublauch, M. A. Musen, and A. L. Rector. Editing description logic ontologies with the protege owl plugin. Whistler, BC, Canada, 2004.
M. Stonebraker, U.çetintemel, S.B. Zdonik: The 8 requirements of real-time stream processing. SIGMOD Record 34(4): 42-47 (2005).
Grosof, B., Horrocks, I., Volz, R., Decker, S.: Description logic programs: combining logic programs with description logic. In: WWW'03. 48-57.
European Office Action dated Aug. 18, 2010 in corresponding European Appln. No. 08 807 375.4-2212.
Nokia: "Nokia N95 User guide" Internet Citation, [Online] Aug. 2007, pp. 1-138, XP002498111 Retrieved from the Internet: URL:http://static.tigerdirect.com/pdf/NokiaN95usermanualUS.pdf [retrieved on Oct. 1, 2008].
"Adobe PDF Security - Understanding and Using Security Features with Adobe Reader and Adobe Acrobat" Internet Citation, [Online] XP003013727 Retrieved from the Internet: URL:http://www.adobe.com/products/pdfs/AdobePDFSecurityGuide-c.pdf [retrieve on Jan. 1, 2007].

* cited by examiner

```
( :action VideoImageSampler
  :params ?VideoSegment_1 - VideoSegment ?TimeInterval_1 - TimeInterval
          ?Subject - thing)
  :precondition (contains ?VideoSegment_1) (contains ?TimeInterval_1)
  (videoOf ?VideoSegment_1 ?Subject) (takenAt ?VideoSegment_1 ?timeInterval_1)
  (hasSegmentWidth ?VideoSegment_1 0.5) (hasFormat ?VideoSegment_1 com.rts.mpeg4)
  (hasFormat ?TimeInterval_1 com.rts.TimeInterval))
  :effect (contains _Image_1) (contains _Time_1) (imageOf _Image_1 ?Subject)
  (takenAtTime _Image_1 _Time_1) (inRange _Time_1 ?TimeInterval_1)
  (hasFormat _Image_1 com.rts.jpg) (hasFormat _Time_1 java.util.Time)
  (extractedFrom _Image_1 ?VideoSegment_1) (videoOf ?VideoSegment_1 ?Subject)
  (takenAt ?VideoSegment_1 ?TimeInterval_1) (hasSegmentWidth ?VideoSegment_1 0.5)
  (hasVideoSeg ?Subject ?VideoSegment_1) ) ))
```

| Components | Streams | Prereason | Plan |
|---:|---:|---:|---:|
| 10 | 15 | 4.66 | 0.15 |
| 20 | 40 | 10.29 | 0.22 |
| 30 | 119 | 27.49 | 0.76 |
| 40 | 190 | 38.48 | 1.21 |
| 50 | 288 | 59.17 | 2.26 |
| 100 | 1,204 | 233.03 | 28.73 |

FIG. 8

METHOD FOR MODELING COMPONENTS OF AN INFORMATION PROCESSING APPLICATION USING SEMANTIC GRAPH TRANSFORMATIONS

GOVERNMENT INTERESTS

This invention was made with Government support under Contract No.: H98230-05-3-0001 awarded by the U.S. Department of Defense. The Government has certain rights in this invention.

RELATED APPLICATIONS

This application is related to: commonly assigned U.S. application entitled "METHOD AND SYSTEM FOR ASSEMBLING INFORMATION PROCESSING APPLICATIONS BASED ON DECLARATIVE SEMANTIC SPECIFICATIONS", application Ser. No. 11/695,238, filed concurrently herewith and incorporated by reference herein in its entirety; commonly assigned U.S. application entitled "METHOD AND SYSTEM FOR AUTOMATICALLY ASSEMBLING STREAM PROCESSING GRAPHS IN STREAM PROCESSING SYSTEMS", application Ser. No. 11/695,487, filed concurrently herewith and incorporated by reference herein in its entirety; commonly assigned U.S. application entitled "METHOD FOR SEMANTIC MODELING OF STREAM PROCESSING COMPONENTS TO ENABLE AUTOMATIC APPLICATION COMPOSITION", application Ser. No. 11/695,457, filed concurrently herewith and incorporated by reference herein in its entirety; commonly assigned U.S. application entitled "METHOD FOR DECLARATIVE SEMANTIC EXPRESSION OF USER INTENT TO ENABLE GOAL-DRIVEN STREAM PROCESSING", application Ser. No. 11/695,430, filed concurrently herewith and incorporated by reference herein in its entirety; commonly assigned U.S. application entitled "METHOD AND SYSTEM FOR AUTOMATICALLY ASSEMBLING PROCESSING GRAPHS IN INFORMATION PROCESSING SYSTEMS", application Ser. No. 11/695,349, filed concurrently herewith and incorporated by reference herein in its entirety; commonly assigned U.S. application entitled "METHOD FOR DECLARATIVE SEMANTIC EXPRESSION OF USER INTENT TO ENABLE GOAL-DRIVEN INFORMATION PROCESSING", application Ser. No. 11/695,279, filed concurrently herewith and incorporated by reference herein in its entirety; and commonly assigned U.S. application entitled "METHOD AND SYSTEM FOR COMPOSING STREAM PROCESSING APPLICATIONS ACCORDING TO A SEMANTIC DESCRIPTION OF A PROCESSING GOAL", application Ser. No. 11/695,410, filed concurrently herewith and incorporated by reference herein in its entirety.

BACKGROUND OF THE INVENTION

1. Technical Field

The present invention relates to modeling components of an information processing application, and more particularly, to a method for modeling components of an information processing application using semantic graph transformations.

2. Discussion of the Related Art

Generally, software applications achieve a desired processing outcome at the request of a person or agent by using a collection of reusable software components assembled to achieve the outcome. When a request must be accommodated and no suitable application exists, the requester can cobble together a solution by collecting partial solutions from existing applications, doing some additional manual work to complete the task. However, new or adapted applications are generally needed; thus, requiring the initiation of a human process to accumulate application requirements and to develop/adapt/assemble applications that can achieve the desired outcome. A challenge arises in understanding the processing request, understanding the components that might achieve the desired outcome, and knowing how to build and/or assemble the components to achieve the processing outcome and fulfill the request.

Expressing desired processing outcomes directly as computer programs coded using general-purpose languages such as C++ or Java generally requires long development cycles and imposes high maintenance costs for any new type or variant of information processing outcome. Casting such requests as traditional queries can reduce some of the costs and delays by providing a simpler means of expressing and applying complex data transformations, etc. However, these query-oriented approaches do not offer sufficient coverage for a wide variety of requests involving non-query goals or requests for outcomes involving operations on unstructured data (e.g., speech-to-text and image recognition operations), nor are they resilient in the face of modifications to underlying conceptual schemas.

Both of the programming approaches and the query approaches suffer from an absence of an explicitly declared intent. In other words, they do not explicitly denote the intent of the outcome requested, with instead the intent being implicit and often only present in the minds of software developers. Thus, any adjustments to either the requested outcome or the underlying conceptual schemas can become challenging and costly, often requiring developers to "reverse engineer" existing applications in an attempt to harvest the original intent in order to adapt to the modifications.

Further, in such approaches, the requester of the processing outcome must generally know some potentially large amount of detail as to the means of fulfilling the request. For example, programmers need to know specific steps to be taken and query writers need to know the structure of tables and the details of the operation composition to produce just one approach, representing only one approach to fulfilling the request. If there are many possible means of satisfying a request, the users must also know which way is best, under what circumstances, and the circumstances under which their solutions are to be used.

SUMMARY OF THE INVENTION

In an exemplary embodiment of the present invention, a method for modeling a component of an information processing application, comprises: defining an applicability condition of a component, wherein the applicability conditions includes variables representing objects that must be included in a pre-inclusion state and a graph pattern that semantically describes the objects that must be included in the pre-inclusion state, wherein the pre-inclusion state is a state against which the applicability of the component for inclusion in a processing graph is evaluated, wherein the graph pattern that semantically describes the objects that must be included in the pre-inclusion state includes triple patterns; and defining an inclusion effect of the component, wherein the inclusion effect includes variables representing objects that must be included in a post-inclusion state and a graph pattern that semantically describes the objects that must be in the post-inclusion state, wherein the post-inclusion state is a state resulting from inclusion of the component in the processing graph, wherein the graph pattern that semantically describes the objects that must be included in the post-inclusion state includes triple patterns.

The variables representing objects that must be included in a post-inclusion state include entities carried forward from a pre-inclusion state applied to the component or new entities created upon the inclusion of the component in the processing graph.

The graph pattern that semantically describes the objects that must be in the post-inclusion state includes a triple pattern carried forward from a pre-inclusion state applied to the component or a new triple pattern created upon the inclusion of the component in the processing graph.

When the defined applicability condition and the defined inclusion effect form a modeled component, the method further comprises: inputting a plurality of the modeled components; inputting a processing request, wherein the processing request includes a goal that is represented by a graph pattern that semantically describes a desired processing outcome; and assembling a processing graph that includes at least one of the components that satisfies the desired processing outcome.

Assembling the processing graph further comprises: identifying a pre-inclusion state of the processing graph, wherein the pre-inclusion state includes terms that represent objects included in the pre-inclusion state and a graph that semantically describes the objects in the pre-inclusion state; and matching the pre-inclusion state of the processing graph to an applicability condition of a first component of the plurality of modeled components if the pre-inclusion state of the processing graph includes objects that must be included in a pre-inclusion state of the first component, and if the graph that semantically describes the objects in the pre-inclusion state of the processing graph satisfies the graph pattern that semantically describes the objects that must be included in a pre-inclusion state of the first component.

The graph that semantically describes the objects in the pre-inclusion state includes triple patterns.

The method further comprises applying the pre-inclusion state of the processing graph to the first component when the pre-inclusion state of the processing graph and the applicability condition of the first component are matched to each other.

The method further comprises generating a new post-inclusion state by applying differences between the inclusion effect of the first component and the applicability condition of the first component to the pre-inclusion state matched to the applicability condition of the first component based on a on a graph transformation operation.

When the processing graph includes no component, the pre-inclusion state of the processing graph is an initial state. The pre-inclusion state of the processing graph that includes at least one component is a post-inclusion state of a last component included in the processing graph. A component with no defined applicability condition matches any state.

In an exemplary embodiment of the present invention, a system for modeling a component of an information processing application, comprises: a memory device for storing a program; a processor in communication with the memory device, the processor operative with the program to: define an applicability condition of a component, wherein the applicability conditions includes variables representing objects that must be included in a pre-inclusion state and a graph pattern that semantically describes the objects that must be included in the pre-inclusion state, wherein the pre-inclusion state is a state against which the applicability of the component for inclusion in a processing graph is evaluated, wherein the graph pattern that semantically describes the objects that must be included in the pre-inclusion state includes triple patterns; and define an inclusion effect of the component, wherein the inclusion effect includes variables representing objects that must be included in a post-inclusion state and a graph pattern that semantically describes the objects that must be in the post-inclusion state, wherein the post-inclusion state is a state resulting from inclusion of the component in the processing graph, wherein the graph pattern that semantically describes the objects that must be included in the post-inclusion state includes triple patterns.

The variables representing objects that must be included in a post-inclusion state include entities carried forward from a pre-inclusion state applied to the component or new entities created upon the inclusion of the component in the processing graph.

The graph pattern that semantically describes the objects that must be in the post-inclusion state includes a triple pattern carried forward from a pre-inclusion state applied to the component or a new triple pattern created upon the inclusion of the component in the processing graph.

When the defined applicability condition and the defined inclusion effect form a modeled component, the processor is further operative with the program to: receive a plurality of the modeled components; receive a processing request, wherein the processing request includes a goal that is represented by a graph pattern that semantically describes a desired processing outcome; and assemble a processing graph that includes at least one of the components that satisfies the desired processing outcome.

When assembling the processing graph the processor is further operative with the program to: identify a pre-inclusion state of the processing graph, wherein the pre-inclusion state includes terms that represent objects included in the pre-inclusion state and a graph that semantically describes the objects in the pre-inclusion state; and match the pre-inclusion state of the processing graph to an applicability condition of a first component of the plurality of modeled components if the pre-inclusion state of the processing graph includes objects that must be included in a pre-inclusion state of the first component, and if the graph that semantically describes the objects in the pre-inclusion state of the processing graph satisfies the graph pattern that semantically describes the objects that must be included in a pre-inclusion state of the first component.

The graph that semantically describes the objects in the pre-inclusion state includes triple patterns.

The processor is further operative with the program to apply the pre-inclusion state of the processing graph to the first component when the pre-inclusion state of the processing graph and the applicability condition of the first component are matched to each other.

The processor is further operative with the program to generate a new post-inclusion state by applying differences between the inclusion effect of the first component and the applicability condition of the first component to the pre-inclusion state matched to the applicability condition of the first component based on a on a graph transformation operation.

When the processing graph includes no component, the pre-inclusion state of the processing graph is an initial state. The pre-inclusion state of the processing graph that includes at least one component is a post-inclusion state of a last component included in the processing graph. A component with no defined applicability condition matches any state.

In an exemplary embodiment of the present invention, a computer program product comprising a computer useable medium having computer program logic recorded thereon for modeling a component of an information processing application, the computer program logic comprises: program code for defining an applicability condition of a component, wherein the applicability conditions includes variables representing objects that must be included in a pre-inclusion state and a graph pattern that semantically describes the objects that must be included in the pre-inclusion state, wherein the pre-inclusion state is a state against which the applicability of the component for inclusion in a processing graph is evaluated, wherein the graph pattern that semantically describes the objects that must be included in the pre-inclusion state includes triple patterns; and program code for defining an inclusion effect of the component, wherein the inclusion effect includes variables representing objects that must be included in a post-inclusion state and a graph pattern that semantically describes the objects that must be in the post-inclusion state, wherein the post-inclusion state is a state resulting from inclusion of the component in the processing graph, wherein the graph pattern that semantically describes the objects that must be included in the post-inclusion state includes triple patterns.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

BRIEF DESCRIPTION OF THE DRAWINGS

FIG. 6 illustrates the component of FIG. 2 represented in a Stream Processing Planning Language (SPPL) according to an exemplary embodiment of the present invention;

FIG. 8 illustrates time taken to plan a processing graph according to an exemplary embodiment of the present invention.

DETAILED DESCRIPTION OF EXEMPLARY EMBODIMENTS

Figure 1:
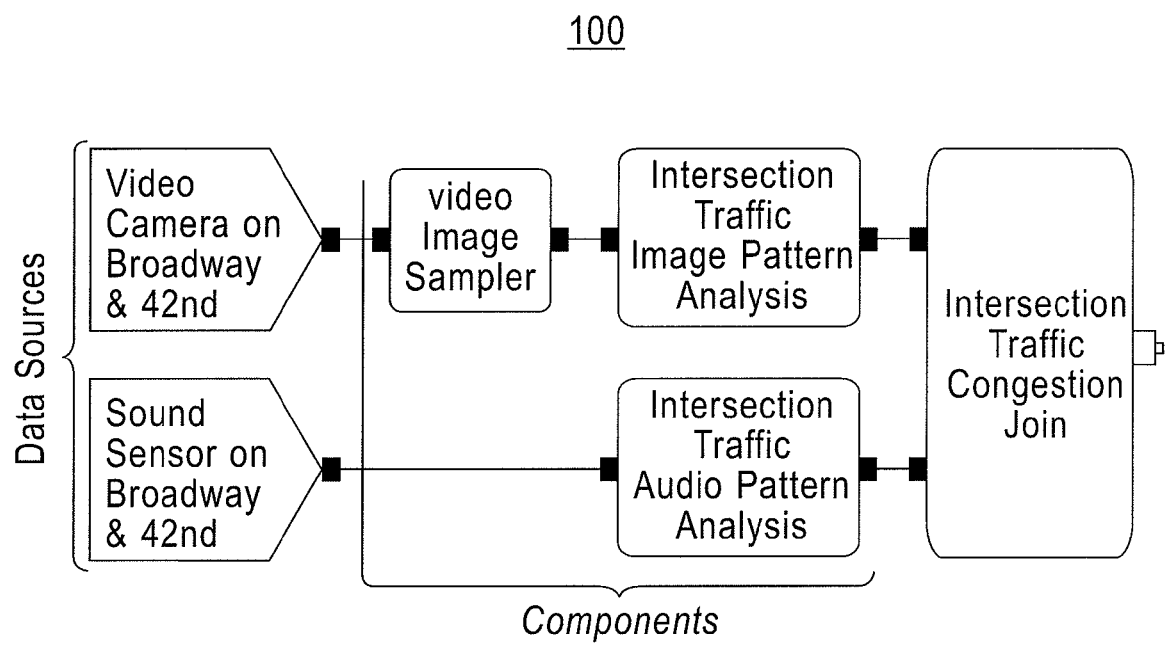
FIG. 1 illustrates a processing graph according to an exemplary embodiment of the present invention.

In accordance with an exemplary embodiment of the present invention, a method and system for composing processing graphs automatically, and on-the-fly, whenever a processing request is submitted is provided. For automatic composition of these graphs, rich descriptions of different components, descriptions of conditions necessary for incorporation of the components into the processing graph and of states resulting from incorporating the components into the processing graph are needed. In this embodiment, an expressive model for describing these software components based on semantic graph transformations is used. The applicability conditions and inclusion effects for these components are described using resource description framework (RDF) graph patterns. These graph patterns describe states of the processing graph during assembly, conditions necessary for inclusion of the components into the graph and effects of including the components into the graph. In addition, the terms used in these patterns are defined in Web Ontology Language (OWL) ontologies that describe the application domain.

In another exemplary embodiment where the information processing applications are dataflow applications, the applicability conditions for a component describe the kinds of data the component takes as input, and the inclusion effects describe the data the component would produce as an output if the component were incorporated into the processing graph.

In contrast to other precondition-effect models like OWL-Semantic (OWL-S), the expressive model describes applicability conditions and inclusion effects in terms of semantic graphs based on instances or individuals, whereby the variables representing objects in the state and the semantic graphs describing these objects can be forwarded and extended by components. The expressive model allows the use of variables in the describing inputs and outputs, elements of a state that are excluded from OWL-S state descriptions. Absence of this type of description and forwarding results in the need to create a large number of nearly identical, special-purpose components, most of which would not be reusable across multiple application domains. In contrast, the forwarding and extension of the objects and their semantic descriptions supported by the expressive model better supports the use of more generic components in specific contexts, reducing the number of specialized components that must be crafted, allowing the more generic components to be reused across a larger set of problem domains.

In contrast to other existing general component description models, both semantic and syntactic like Web Service Description Language (WSDL), OWL-Semantic (OWL-S), Semantic Annotations for WSDL (SAWSDL), Java interfaces, Common Object Request Broker Architecture Interface Definition Language (CORBA IDL), etc., which describe the inputs and outputs of components in terms of datatypes or classes (or concepts in an ontology in the case of a semantic model), the expressive model as applied to dataflow applications describes inputs and outputs in terms of semantic graphs based on instances or individuals. The instance-based approach of the expressive model allows associating constraints on the input and output data based on both the classes they belong to and their relationship to other instances. Such constraints are more difficult to express in class-based representations and often require the creation of a large number of additional classes corresponding to different combinations of constraints. As a result, the expressive model allows associating rich semantic information about components, which aids in the composition of processing graphs.

In further contrast to other semantic component models like OWL-S and Web Service Modeling Ontology (WSMO), which define preconditions and effects on the state of the world for a service, or WSMO, which also defines preconditions and postconditions on the information space of a service, the expressive model defines rich constraints on the input and output data for a component. The expressive model is particularly suited for a wide variety of data processing components. These components typically operate by consuming m input messages, processing them in some fashion and producing n output messages. They do not depend on the state of the world in any other way. The expressive model describes each of the m input and n output messages as RDF graph patterns.

In accordance with another exemplary embodiment of the present invention, a semantic planner that can automatically build processing graphs given a user query that is expressed as an RDF graph pattern is provided. The planner uses reasoning based on Description Logic Programs (DLP) (as described in Grosof, B., Horrocks, I., Volz, R., Decker, S.: Description logic programs: combining programs with description logic. In: WWW'03. 48-57, a copy of which is incorporated by reference herein in its entirety), as well as multi-objective optimization techniques to build plans. The planner uses a two-phase approach where pre-reasoning is performed on component descriptions and the results of reasoning are then reused when generating plans for different goals or queries.

Before describing the above-mentioned exemplary embodiments in detail, a data-flow oriented processing graph will be introduced followed by a running example that will be referred to in the description of the exemplary embodiments.

Processing Graph and Running Example

A processing request is a semantically-expressed request for processing to be performed by a suitable processing application. Typically, such requests are for the production of information, but other types of outcomes are possible. Applications that process these requests are viewed as compositions of reusable software components. The compositions are referred to as processing graphs, with the nodes being the various software components, interconnected by arcs connecting inclusion effects, which are typically output data productions, to applicability conditions, which are typically input data requirements. As shown in FIG. 1, for a given processing request, a collection of data sources and components can be configured into a processing graph 100 that can achieve the request's goal.

A processing graph might draw from one or more data sources, and may perform any type of processing. For example, a dataflow processing graph can be used to describe the flow of data through a number of components in an information system. The flow of data normally takes the form of one or more messages transmitted from one component to another. Components can transfer messages in different ways. They may use request-response based transfer as in the case of a web services based workflow; a publish-subscribe based transfer as in the case of an event-driven publish-subscribe system; or a stream-based transfer as in the case of a multimedia system.

The running example that will be referred to in the description of the exemplary embodiments is based on a system that provides real time traffic information and vehicle routing services based on the analysis of real-time data obtained from various sensors, web pages and other sources of information. In this example, it will be assumed that a user has a given continuous query for traffic congestion levels for a particular roadway intersection, say Broadway and $42^{nd}$ street in New York City. A processing graph that is constructed for such a request may use raw data from different sources. For example, it may use video from a camera at the intersection by extracting images from the video stream and examining them for alignment to visual patterns of congestion at an intersection (see the upper thread in FIG. 1). To improve the accuracy it may also get data from a sound sensor at the intersection and compare it with known congestion audio patterns (see the lower thread of FIG. 1). The end-result is achieved by combining feeds from the two analytic chains.

A description of how the components of the processing graph are described and how a planner can automatically construct the processing graph given a user query will now be provided.

Semantic Graph-Transformation Model of Components

Dataflow processing graphs in information systems involve messages being sent from one component to another. In the expressive model, components are described by the types of messages they require as an input and the types of message they produce as an output. The model describes data objects contained in the input and output messages and the semantics of these data objects as RDF graphs patterns. A component takes m input graph patterns, process (or transforms) them in some fashion and produces n output graph patterns. The model provides a blackbox description of the component, for example, it only describes the input and output, it does not model an internal state of the component.

Figure 2:
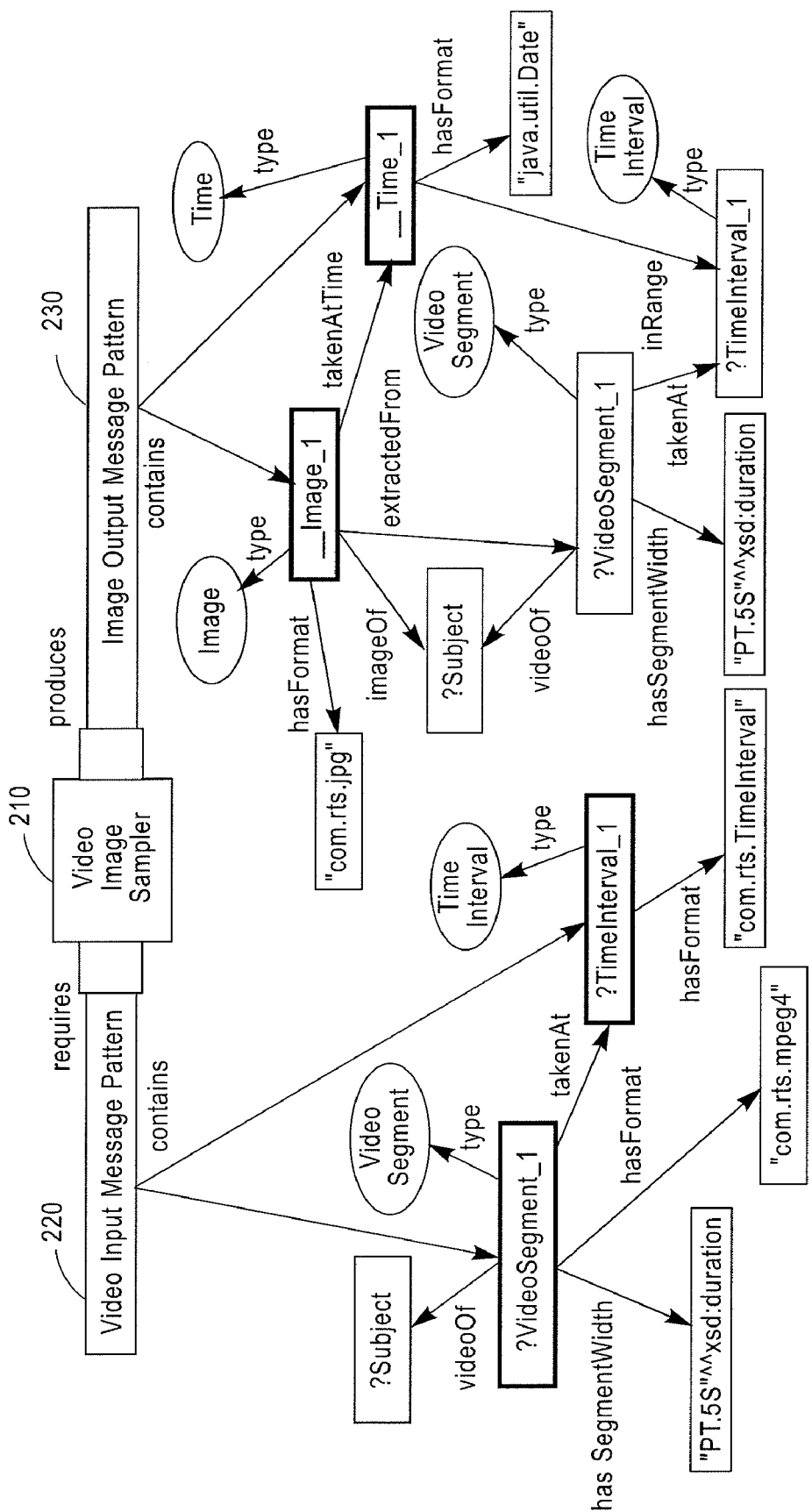
FIG. 2 illustrates a component semantic description according to an exemplary embodiment of the present invention.

For example, consider a VideoImageSampler component 210 in FIG. 2, which has one input 220 and one output 230. An input message must contain two objects: a video segment (?VideoSegment_1) and a time interval (?TimeInterval_1). The component 210 analyzes the input message 220 and produces the output message 230 containing two new objects: an image (_Image_1) that it extracts from the video segment, and a time (_Time_1) for the image, which lies within the input time interval. There are other constraints associated with these objects in the input and output messages 220 and 230, such as (?VideoSegment_1 takenAt ?TimeInterval_1), and (?VideoSegment_1 hasSegmentWidth PT.5S^^xsd:duration). The property type in FIG. 2 is an rdf:type property. Namespaces of terms are not shown in FIG. 2.

The example shown in FIG. 2 illustrates how the inputs and outputs of components can be described in terms of instance-based (or object-based) graph patterns. This is in contrast to class-based descriptions that are commonly used in various interface description languages. As previously mentioned, the instance-based descriptions allow associating rich semantics to the component by specifying the complex inner-relationships between different instances. Such relationships are more difficult to capture using class-based descriptions without having to create a large number of new classes for different combinations of relationship constraints.

A component model will now be formally described. Some elements of the model are adapted from SPARQL—Query Language for RDF, W3C Candidate Rec., which is a language for expressing queries against semantically described data (e.g., data described using RDF graphs).

Let U be the set of all URIs. Let $RDF_L$ be the set of all RDF literals. The set of RDF terms, $RDF_T$, is $U \cup RDF_L$. RDF also defines blank nodes, which are not included in the model. An RDF triple is a member of the set of $U \times U \times RDF_T$. An RDF graph is a set of RDF triples.

A variable is a member of the set V where V is infinite and disjoint from $RDF_T$. A variable is represented with a preceding "?".

A triple pattern is a member of the set $(RDF_T \cup V) \times U \times (RDF_T \cup V)$. An example is (?VideoSegment_1 takenAt ?TimeInterval_1).

A graph pattern is a set of triple patterns.

An input message pattern describes the type of input messages a component requires. It is a 2-tuple of the form (VS, GP) such that VS is a set of variables representing the data objects that must be contained in the message. $VS \in 2^V$. GP is a graph pattern that describes the semantics of the data objects in the message.

In an output message, a component may create new objects that did not appear in any of the input messages. In the output message pattern description, these new objects are represented explicitly. New objects act as existentially quantified variables. In a specific output message, these new objects are replaced by RDF terms. The new objects may either be contained in the message or be part of the semantic description of the data objects in the message.

A new object is a member of the set NO where NO is infinite and disjoint from $RDF_T \cup V$. A new object is represented with a preceding "_".

The output message description of a component has a combination of variables and new objects created. Variables represent those entities that were carried forward from the input message description and new objects represent those entities that were created by the component in the output message description. An output message (om)-triple pattern and a graph pattern to represent this feature of output messages will now be described.

An om-triple pattern is a member of the set $(RDF_T \cup V \cup NO) \times U \times (RDF_T \cup V \cup NO)$. An example is (_Image_1 extractedFrom ?VideoSegment_1).

An om-graph pattern is a set of om-triple patterns.

An output message pattern is a 2-tuple, (OS, OMGP) such that OS is a set of variables and new objects created that represent the data objects that must be contained in the output message. $OS \in 2^{V \cup NO}$. And, OMGP is an om-graph pattern that describes the semantics of the data objects in the output message.

A component is a 3-tuple of the form (CN, <IMP>, <OMP>) where CN is a URI that represents the name of the component. <IMP> is a set of input message patterns that describe the input requirements of the component. The different message patterns may overlap (i.e., the graph patterns they contain may share common nodes and edges). The overlap helps describe dependencies between different input message patterns. <OMP> is a set of output message patterns that describe the outputs of the component. Again, the different message patterns may overlap among themselves as well as with the input message patterns. The set of variables in <OMP> is a subset of the set of variables that are described in <IMP>. This helps ensure that no free variables exist in the output description, an essential requirement for the planning process.

The actual messages need not be in the form of RDF graphs. Depending on the actual middleware and communication mechanism, these messages may be in different formats such as XML messages in the case of web services; serialized objects in the case of COBRA and Jini; or various streaming audio, video and image formats in the case of multimedia networks. In this embodiment, each message is formatted as a collection of serialized Java objects. For example, the component description states that the format of ?VideoSegment_1 should be Java class (com.egs.mpeg4), which represents a byte array containing the video segment.

Sending a Component Input Messages

The semantic description of a component gives a general, application independent, description of the types of messages it takes in and the types of messages it produces. In a given application or dataflow, the component is going to be given a set of input messages. The formal model of a message and the conditions a message must satisfy to be given as an input to a component will now be described.

A message is a 3-tuple of the form (ID, MD, MG) such that: ID is a string that is a unique identifier for the message; MD is the set of RDF terms that represent that data objects contained in the message; and MG is an RDF graph containing triples representing OWL facts that describe the semantics of the data objects in the message. The graph describes the constraints associated with all the data objects in the message.

Figure 3A:
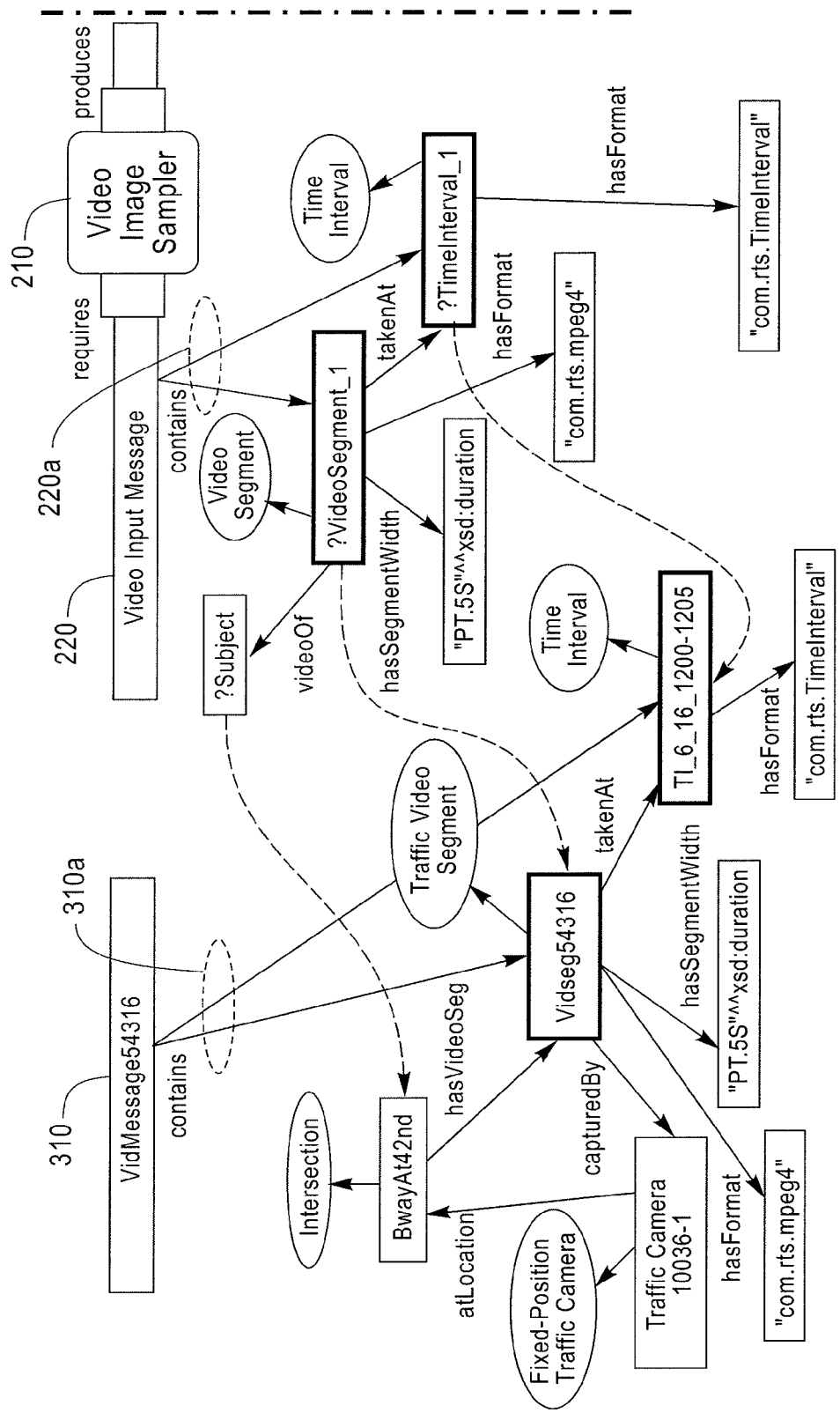
FIG. 3 illustrates matching a message to an input message pattern of a component according to an exemplary embodiment of the present invention.
Figure 3B:
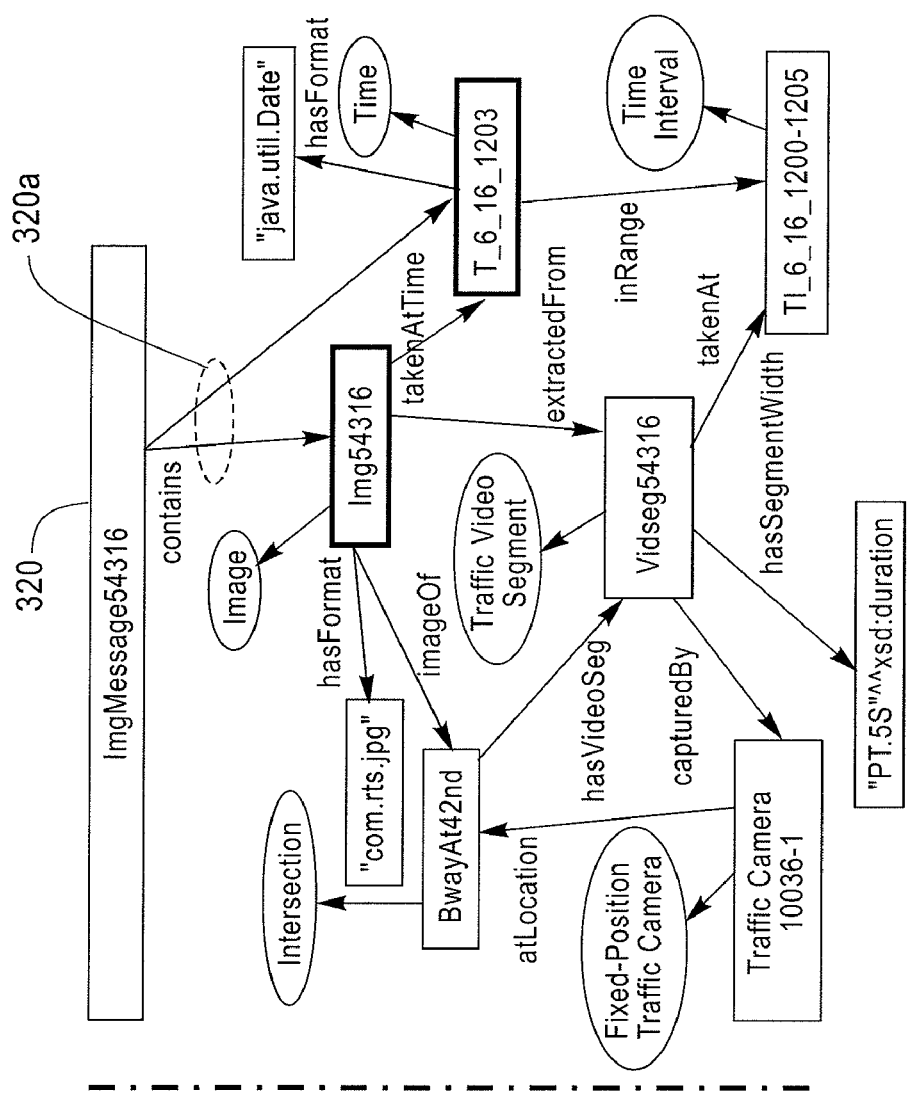

An example of a message 310 identified by VidMessage54316 is shown in the left side of FIG. 3. This message 310 contains a specific video segment at a specific time interval captured by a traffic camera on the BwayAt42nd intersection. It is noted that the message description only has OWL facts (i.e., ABox assertions). It does not contain any TBox axioms.

Matching a Message with a Message Pattern. In order for a message to be given as input to a component, it is necessary for the message to match the message pattern that represents the component's input requirement. The match is defined in terms of a pattern solution that expresses a substitution of the variables in an input message pattern.

Pattern Solution. A pattern solution is a substitution function ($\theta: V \to RDF_T$) from the set of variables in a graph pattern to the set of RDF terms. For example, some of the mappings defined in a possible definition of $\theta$ for the example graph pattern include: $\theta$ (?VideoSegment_1)=VidSeg54316, $\theta$ (?TimeInterval_1)=TI_6_16_1200_1203, etc.

The result of replacing a variable, v is represented by $\theta$ (v). The result of replacing all the variables in a graph pattern, GP, is written as $\theta$ (GP).

Condition for Match. Consider an input message pattern P(VS, GP), and a message M(ID, MD, MG). Define that P is matched by M based on an ontology, O, if and only if there exists a pattern solution, $\theta$, defined on all the variables in GP such that the following conditions hold: $\theta$ (VS)$\subseteq$MD, that is, the message contains at least the data objects that the pattern states it must contain; $MG \cup O \models_E \theta$ (GP) where O is the common ontology and $\models_E$ is an entailment (i.e., satisfaction) relation defined between RDF graphs. In this system, entailment is considered based on OWL-DLP; though, in general the entailment may be based on RDF, OWL-Lite, OWL-DL or other logics. This condition implies that the substituted graph pattern of the input to the component must be satisfied by the graph describing the message.

This match is represented as $M \triangleright_\theta P$ to state that message M matches message pattern, P, with a pattern solution $\theta$. One way of looking at the above definition is that the message should have at least as much semantic information as described in the pattern. FIG. 3 shows how the VidMessage54316 message 310 might match the Video Input Message Pattern 220. The dashed arrows (between graphs 310*a* and 220*a*) show the variable substitutions. In order to make the match, some DLP reasoning based on subclass and inverse property relationships must be done. For example, the triple (VidSeg54316 videoOfBwayAt42nd) is inferred, since videoOf is declared to be an inverse property of hasVideoSeg. Also, the triple (VidSeg54316 type VideoSegment) is inferred, since TrafficVideoSegment is declared to be a subclass of VideoSegment. Once the inferences are done, it is clear that the graph on the right 220*a* is a subgraph of the graph on the left 310*a*; hence, a match is obtained.

In a more general case, for a component that has m input message requirements ($P_1 \ldots P_m$), m input messages ($M_1 \ldots M_m$) are needed to be given to it, such that $M_i \triangleright_\theta P_i$, for $i=1 \ldots m$ and for some substitution function $\theta$ that is common across all messages.

Determining the Output Messages of a Component

When a set of input messages are given to a component, the component generates output message. The actual description of the output messages is generated by combining the descriptions of the input messages with the output message patterns of the component. This combination is formally defined in terms of a graph transformation operation. This operation captures the notion that some of the semantics of the input messages are propagated to the output messages, and it uses graph differences between the input and output message patterns to decide how to produce the final output message.

Let $L_i$, $i=1 \ldots m$, be the graph patterns of m input requirements to a component. Let $R_j$, $j=1 \ldots n$, be the n output graph patterns of the component.

Let $\overline{L} = \cup_{i=1}^{m} L_i$ and $\overline{R} = \cup_{j=1}^{n} R_j$, where $\cup$ is a graph union operation. The component implements a graph transformation: $c: \overline{L} \to \overline{R}$.

Now assume that the m input graph patterns have been matched to m messages, that is, $L_i$ is matched to a message that has an RDF graph, $X_i$, $i=1 \ldots m$. Let $\theta$ be the variable substitution function for all the variables in $\overline{L}$.

Let the output messages coming out of the component contain the RDF graphs, $Y_j$, for $j=1 \ldots n$. Each $Y_j$ is determined using a graph homomorphism, $f$, described as: $f: \theta(\overline{L}) \cup \theta(\overline{R}) \to \overline{X} \cup \overline{Y}$ where $\overline{X} = \cup_{i=1}^{m} X_i$ and $\overline{Y} = \cup_{j=1}^{n} Y_j$.

In the model of components, f satisfies the following properties for $i=1 \ldots m$ and $j=1 \ldots n$:

1. $f(\theta(L_i)) \subseteq X_i$. This means that each substituted input graph pattern is a subgraph of the graph describing the message attached to it. This follows from the entailment relation between the graphs as defined in the match, $\triangleright_\theta$, between the input message pattern and the message.

2. $f(\theta(R_j)) \subseteq Y_j$. This means that each substituted output graph pattern is a subgraph of the output message.

3. $f(\theta(\overline{L}) \backslash \theta(\overline{R})) = \overline{X} \backslash \overline{Y}$ and $f(\theta(\overline{R}) \backslash \theta(\overline{L})) = \overline{Y} \backslash \overline{X}$ where \ represents the graph difference operation. This means that exactly that part of $\overline{X}$ is deleted which is matched by elements of $\theta(\overline{L})$ not in $\theta(\overline{R})$, and exactly that part of $\overline{Y}$ is created that is matched by elements new in $\theta(\overline{R})$.

Using properties 2 and 3, the outputs, $Y_j$, of a component can be determined as a result of connecting $X_i$ to the component. This operation is performed in two main steps. In the first step, all edges and vertices from $\overline{X}$ that are matched by $(\theta(\overline{L}) \backslash \theta(\overline{R})$ are removed to get a graph D, where $D = \overline{X} \backslash (\theta(\overline{L}) \backslash \theta(\overline{R}))$. It is made sure that D is a legal graph, that is, there are no edges left dangling because of the deletion of source or target vertices. Any components that are disconnected from the set of objects that appear in the output message graphs are removed. In the second step, D is glued with $\overline{R} \backslash \overline{L}$ to get $\overline{Y}$.

An example of the result of this process is shown in FIG. 3 where the output message 320 of the Video Image Sampler 210 is generated based on the message 310 given as its input. It is noted (by viewing graph 320a) that some of the semantics of the input message (shown in graphs 310a and 220a) are propagated to the output message of the component. For example, the output message 320 is described using the same intersection and traffic camera that appeared in the input message 310.

Stream Model and Matching of Components

Previously, it was described how a component is modeled and how it behaves when it is given a certain message as an input. However, in a dataflow, a component will typically receive multiple messages for processing. In order to enable efficient routing of messages between components in a dataflow the notion of a stream is used. A stream is an abstract class of messages that is produced by a component and that may be routed to subsequent components in the dataflow. All messages in a stream share a common semantic description that depends on the component that produced it and the subset of the dataflow graph before the component.

A stream is modeled in terms of an exemplar message on the stream. The exemplar message is represented using new objects, since all the individuals in the semantic description are new objects that were created by a component in the dataflow. In order to model a stream of messages a new object triple and a new object graph are defined.

A new object triple is a member of the set $(RDF_T \cup NO) \times U \times (RDF_T \cup NO)$. An example is (_Image_1 takenAtTime_ Time_1).

A new object graph is a set of new object triples.

A stream is a 2-tuple of the form (NS, NG) such that: NS is a set of new objects that represent the data objects that must be contained in the exemplar message. $NS \in 2^{NO}$. NG is a new object graph that describes the semantics of the data objects in the exemplar message.

Figure 4:
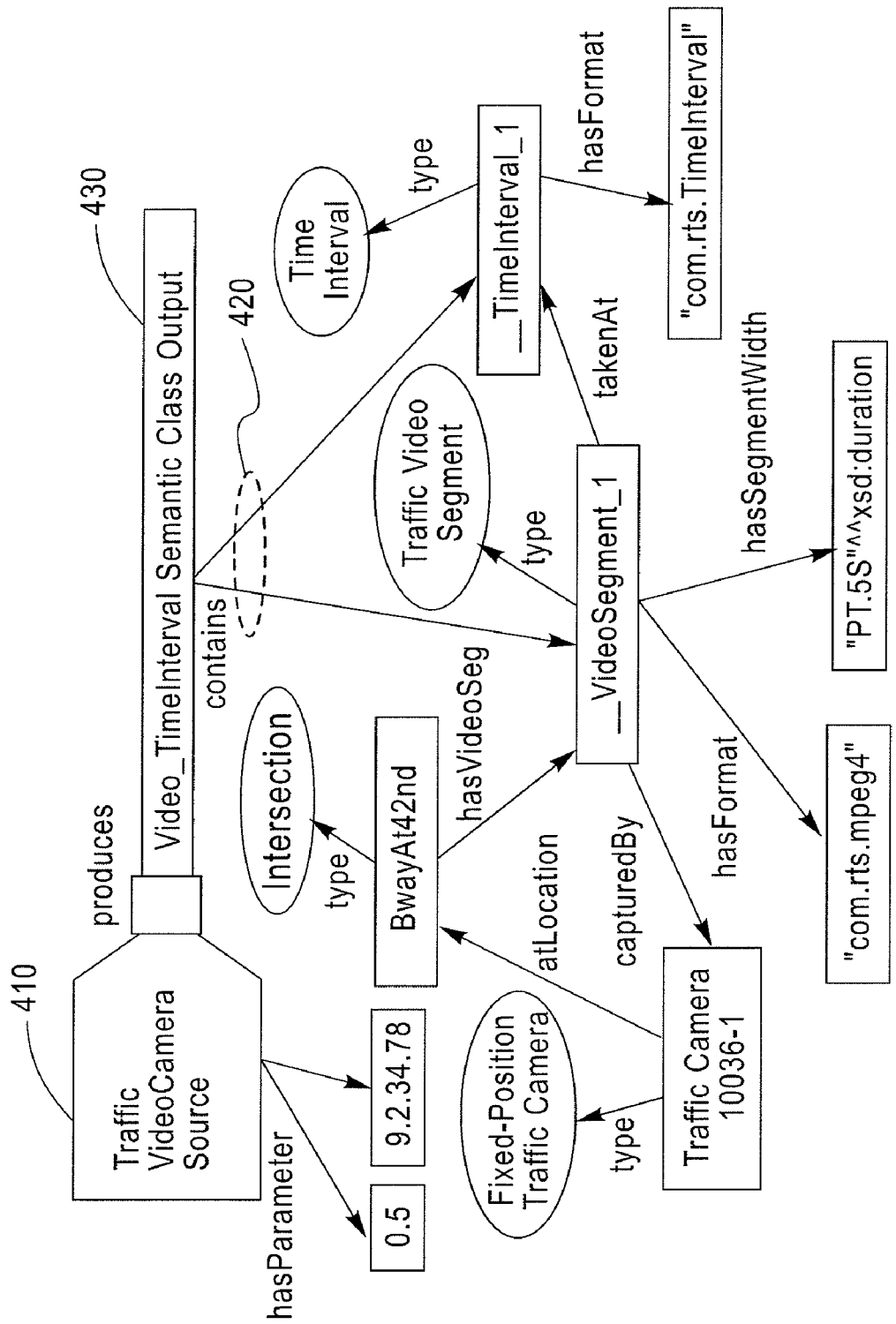
FIG. 4 illustrates a data source semantic description according to an exemplary embodiment of the present invention.

For example, the input message 310 in FIG. 3 is part of a stream of video messages produced by a video camera data source 410 as shown in FIG. 4. This stream is described as a new object graph 420 in FIG. 4. Every message on this stream has two new objects: a video segment and a time interval. The semantics of these new objects are described by the new object graph 420.

By using a stream model, a system embodying the present invention does not have to match every message that is produced by a component with the input message requirement of other components. Instead, the matching can be done just once for a pair of components based on the stream produced by one component and the input message requirement of the other component. To enable matching a stream to a message pattern, the definition of a pattern solution is extended to allow variables to be substituted by RDF terms or by new objects. For purposes of DLP reasoning, a new object is represented as an OWL individual that belongs to the distinguished concept "NewObject". As an example, the Bway-42nd Video Stream in FIG. 4 can be matched to the Video Input Message Pattern 220 in FIG. 2. This means that every message produced by the video camera 410 can be routed to the Video Image Sampler 210.

By using the stream model, individual messages do not have to be associated with semantic descriptions of the data they contain. Instead, the semantics of a message can be derived from the semantics of its stream. The semantic description of a stream may be stored in a respository from where it can be accessed by a planner for purposes of connecting components.

Semantic Planner

A query is represented to an information processing system as a message pattern. This message pattern describes the kind of messages (data objects in the message and the semantics of the data objects) that the user is interested in. This message pattern becomes a goal for the planner. The planner needs to construct a processing graph that produces a stream containing messages that satisfy the pattern. The syntax of the query is similar to SPARQL. An example continuous query for real-time traffic congestion levels at the Broadway-42nd St intersection is:

PRODUCE ?congestionLevel, ?time
WHERE (?congestionLevel rdf:type CongestionLevel), (?time rdf:type Time), (?congestionLevel ofLocation BwayAt42nd), (?congestionLevel atTime ?time)

In the previous sections, the conditions under which two components could be connected to each other based on the stream produced by one component and the input message pattern requirement of the other component were defined. At a high level, the planner works by checking if a set of streams can be connected to a component, and if so, it generates new streams corresponding to the outputs of the component. It performs these recursively and keeps generating new streams until it produces a stream that matches that goal, or until no new unique streams can be produced.

There are a number of challenges in making the planning process scalable. During plan building, the planner typically has to match different streams to the input message patterns of different components a large number of times. Hence, the matching process must be fast for purposes of scalability.

Description logic reasoning during planning is useful since it allows the planner to match streams to message patterns even if they are described using different terms and difference graph structures. However, a key point in stream based planning is that each stream is independent of other streams. That is, all facts in the description of one stream are independent of the facts in the description of other streams, and facts across different streams cannot be combined to infer any additional facts. Also by combining facts across different streams, the knowledgebase may become inconsistent. Hence, if a reasoner is to be used during the planning process, it must be able to keep the different stream descriptions independent of one another, and allow queries or consistency checks to be performed on a single stream description.

Another challenge is that new streams may be produced during the planning process when streams are connected as inputs to a component. In the worst case, an exponential number of new streams may be generated for a given set of components. These new streams may contain new objects in their descriptions. The creation of new streams makes the task of the reasoner more difficult since it has to manage these streams independently.

Figure 5:
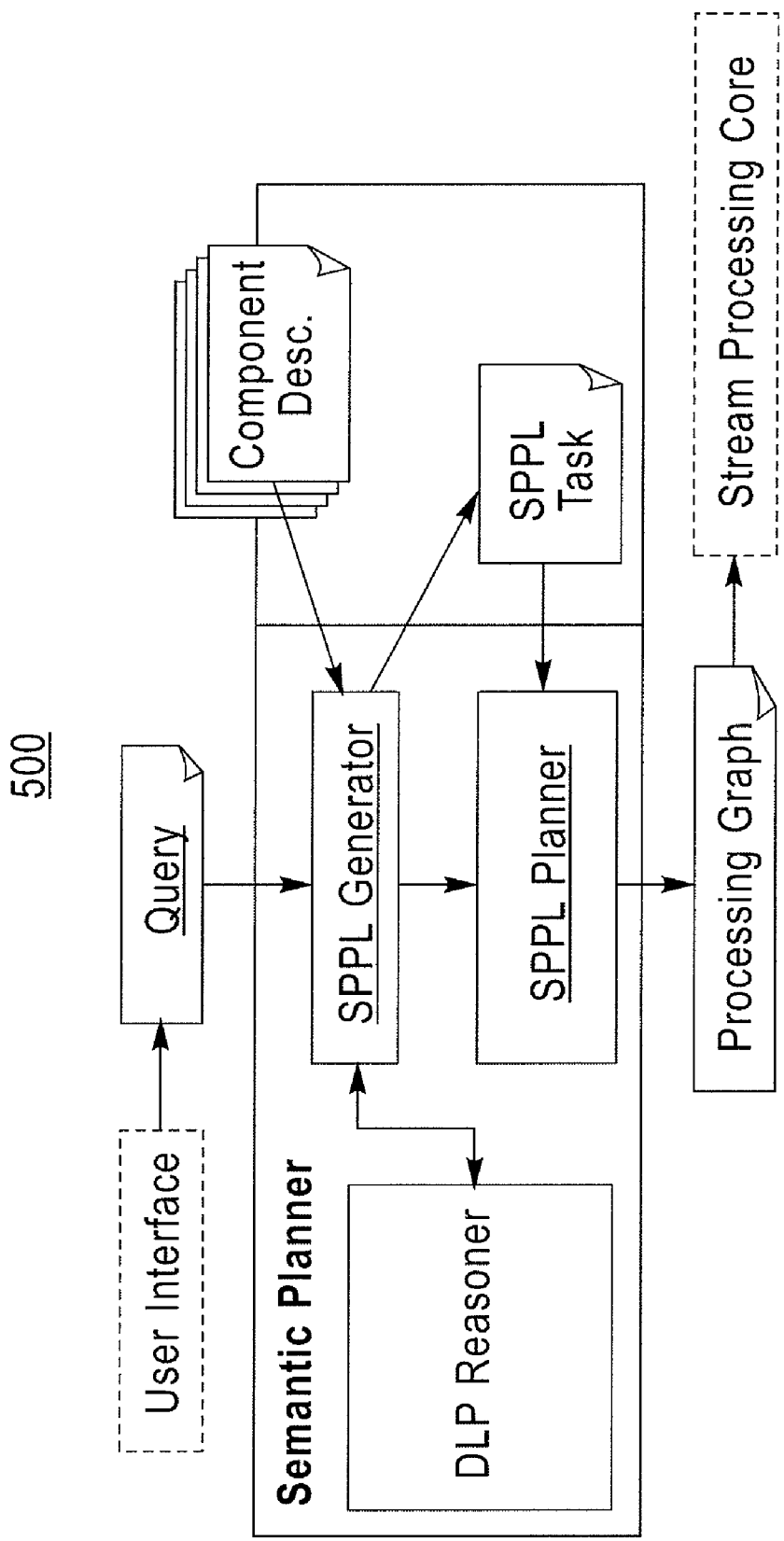
FIG. 5 illustrates a semantic planner according to an exemplary embodiment of the present invention.

Because of these issues, a semantic planner 500 (see FIG. 5) was developed to have a two-phase approach to plan building. In the first phase, which occurs offline, a Stream Processing Planning Language (SPPL) generator translates the descriptions of components into SPPL (described in Riabov, A., Liu, Z.: Planning for stream processing systems. In: AAAI'05, a copy of which is incorporated by reference herein in its entirety). SPPL is a variant of Planning Domain Definition Language (PDDL) and is specialized for describing stream-based planning tasks. SPPL models the state of the world as a set of streams and interprets different predicates only in the context of a stream. During the translation process, the generator also performs DLP reasoning using a DLP reasoner on the output descriptions to generate additional inferred facts about the outputs. The SPPL descriptions of different components are persisted and reused for multiple queries. The second phase is triggered when a query is submitted to the planner 500. During this phase, the generator translates the query into an SPPL planning goal. An SPPL planner produces a plan and/or processing graph consisting of actions that correspond to components. The plan is constructed by recursively connecting components to one another based on their descriptions until a goal stream is produced. In this embodiment, the plan is then deployed, for example, in a System S stream processing system as described in Jain, N., et al.: Design, implementation, and evaluation of the linear road benchmark on the stream processing core. In: SIGMOD'06. (June 2006), a copy of which is incorporated by reference herein in its entirety.

If the number of components is large, there may exist multiple alternative processing graphs for the same query. The SPPL planner uses a number of metrics to compare processing graphs, and returns only processing graphs that are Pareto optimal (i.e., processing graphs that cannot be improved upon in any quality dimension without sacrificing quality in another). The metrics in use include resource utilization and application specific quality measures. The latter are computed using symbolic computation, assuming that components are capable of producing streams at fixed quality levels. Examples of quality measures are output video quality, image resolution, confidence in congestion levels, etc. The quality level of a stream is included in the semantic description of the stream. The resource metric is additive across the components and sources.

A key feature of the planning process is that DLP reasoning is performed only once for a component in an offline manner. During actual plan generation, the SPPL planner does not do any reasoning. It only does subgraph matching, for example, it tries to find a substitution of variables so that the input message graph pattern of a component can be matched to the new object graph of a stream. This allows the matching process to be faster than if reasoning was performed during the matching. In addition, it eliminates the need for a reasoner that has to maintain and reason about independent stream descriptions during the plan building process. The reasoner is only invoked when a new component is added to the system.

Pre-Reasoning and SPPL Generation. DLP reasoning is performed on the output message graph patterns of different components and streams produced by data sources. DLP lies in the intersection of Description Logic and Horn Logic Programs like Datalog. Inference on the ABox in DLP can be performed using a set of logic rules. This allows a certain assertion to be taken and all possible assertions to be enumerated that can be inferred from this assertion and ontology using the rules. The ability to enumerate all inferences is a key reason for the choice of DLP reasoning. Since inferences cannot be directly performed on variables and new objects, they are converted into OWL individuals that belong to a special concept called Variable and NewObject, respectively. Using this process, a graph pattern can be converted into an OWL/RDF graph for the purposes of reasoning, and additional facts about variables and new objects can be inferred.

The concept of an expanded stream description, which contains an RDF graph that has been expanded with the results of DLP reasoning, will now be introduced. The expanded new object graph, NG', includes the original graph, NG, as well as the set of triples obtained by doing reasoning NG based on an ontology O. Reasoning is done by applying the DLP logic rules described, for example, in Grosof, B., Horrocks, I., Volz, R., Decker, S.: Description logic programs: combining logic programs with description logic. In: WWW'03. 48-57, a copy of which is incorporated by reference herein in its entirety, recursively, in a bottom-up fashion, on the triples in NG based on the definitions in the ontology O, and generating additional triples about variables and new objects until a fix point is reached. The reasoner used in this example is the Minerva reasoner, which is described in Zhou, J., Ma, L., Liu, Q., Zhang, L., Yu, Y., Pan, Y.: Minerva: A scalable OWL ontology storage and inference system. In: $1^{st}$ Asian Semantic Web Symp. (2004), a copy of which is incorporated by reference herein in its entirety. For example consider the stream 430 produced by the video camera 410 in FIG. 4. The expanded stream description includes additional facts like (_VideoSegment_1 videoOf BwayAt42nd), since videoOf is defined to be an inverse of hasVideoSeg in the ontology.

After pre-reasoning, the expanded descriptions of sources and components are represented as an SPPL domain, and stored for later use in planning queries. Concepts used in the descriptions are mapped to SPPL types. Subclass relationships between concepts are also captured in SPPL, which supports multiple inheritance. The set of SPPL predicates includes all properties in the descriptions. The set of SPPL objects include all literals, RDF terms and new objects in the descriptions.

Each component is translated into an SPPL action. For a component, each input message pattern is translated into a precondition, and each output message pattern is translated into an effect. In order to obtain the list of predicates for the preconditions and effects, the SPPL generator traverses the graph patterns and obtains all constraints on the new objects and variables. For example, the component 210 in FIG. 2 is represented in SPPL as shown in FIG. 6.

Planning for a given Query. A query received by the semantic planner 500 is translated into an SPPL problem. The SPPL model yields a recursive formulation of the planning problem where goals are expressed similarly to component input requirements, and they are matched to streams produced as outputs by components. The planner 500 operates in two phases: a presolve phase and a plan search phase as described in Riabov, A., Liu, Z.: Planning for stream processing systems. In: AAAI'05. During the presolve phase, the planner analyzes the problem structure and removes sources that cannot contribute to the goals, to help restrict the search space. During the plan search space, the planner 500 performs branch-and-bound forward search by connecting all compatible components to streams produced by already added components, or available from sources, and generating new streams that may contain new objects. It selects Pareto optimal streams that match specified goals. When the planner 500 attempts to connect a stream to a component as input, it tries to match the expanded new object graph of the stream, NC', with the graph pattern GP that describes the component's input requirement. It tries to find a solution, θ, such that θ (GP) is a subgraph of NG', i.e., θ (GP)⊆NG'. If it can find such a solution, then the graph pattern is matched by the stream's graph.

The two-phase matching process, consisting of pre-reasoning and subgraph matching is sound. For example, if the process does not find that a stream matches an input message pattern, then this match is correct since the stream description only contains facts that were present in the original description or that were inferred after DLP reasoning. However, the matching process is not complete. The planner 500 then builds a description of new output streams by combining the descriptions of the matched input streams with the output message pattern description. Since reasoning is only performed offline on output message patterns and raw streams from data sources, it is possible that the description of the new stream may not contain all facts that can be inferred by DLP reasoning. Here, completeness is sacrificed for performance. Since the reasoner is not used during planning, the matching of streams to components becomes simpler and the planner 500 can scale to handle large numbers of components.

Implementation and Evaluation

Figure 7:
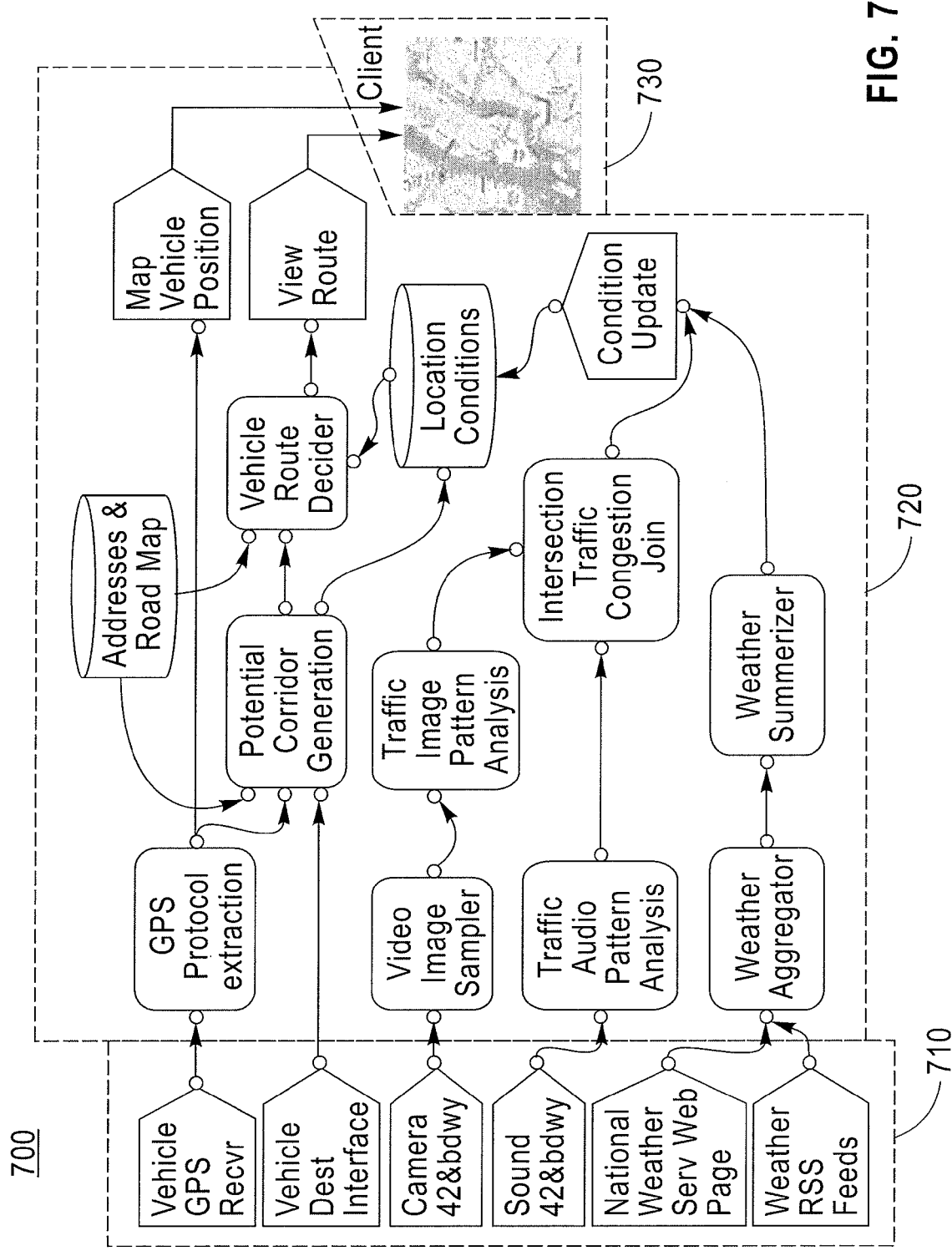
FIG. 7 illustrates a portion of a processing graph assembled according to an exemplary embodiment of the present invention.

The planning algorithm has been deployed and experimented in the System S Stream Processing System. Processing graphs in this system consist of data sources that produce raw data streams, and software components that operate on the data to produce new derived data streams. A number of components and data sources have been described using the model in different domains. Large processing graphs involving a number of components have been successfully planned and deployed. A portion 700 of an exemplary processing graph for determining optimal routes to users in vehicles with GPS receivers is shown in FIG. 7. The processing graph includes data sources 710, components 720 and sinks 730. Some of the components 720, such as Location Conditions, can also have backend databases, since they need to store large volumes of information. Although the implementation uses a stream processing system, the component model and planning algorithm can be applied in systems where components transfer messages using other mechanisms.

The present invention employs a collaborative ontology management framework where different component developers and domain experts can contribute to domain ontologies represented in OWL. Component descriptions are written using terms defined in these ontologies. The descriptions themselves are represented using named RDF graphs. Variables and new objects are represented as OWL individuals belonging to special concepts or literals with special types. In addition, there is a model-driven architecture for the components where skeleton Java code is generated based on the semantic models.

Scalability of the present invention depends on the ability of the compiler to plan with large numbers of sources and components. Compiler performance is evaluated by measuring planning time on increasingly large randomly generated sets of components and data sources. Experiments were carried out on a 3 GHz Intel Pentium 4 PC with 500 MB memory. For these experiments, random processing graphs were generated, with one component for each node in the processing graph. Sources were modeled as components with no inputs. The processing graphs were generated by distributing the nodes randomly inside a unit square, and creating an arc from each node to any other node that has strictly higher coordinates in both dimensions with probability 0.4. The link may reuse an existing output stream (if one exists) from the component with probability 0.5; otherwise, a new output stream is created. The resulting connected components are then connected to a single output node. Each link is associated with a randomly generated RDF graph from a financial services ontology in OWL that had about 200 concepts, 80 properties and 6000 individuals. The time taken to plan the processing graphs (in seconds) is shown in table 800 of FIG. 8. Table 800 has columns for the number of streams and components in the generated graph, as well as time measurements for the online and offline phases of semantic planning.

The experiments show that there is a noticeable increase in planning time as the size of the problem increases. The pre-reasoning approach, nevertheless, makes semantic planning practical by improving planner sealability. Although pre-reasoning is time consuming, the results of the pre-reasoning can be shared between multiple policy compilations. Therefore, the actual response time of the planning system in practice is close to planning phase time. Thus, for example, for plan graphs involving 100 components, the compiler is able to produce the plan in less than 30 seconds, which is an acceptable performance.

It should also be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for modeling a component of an information processing application, comprising:
   defining an applicability condition of a component, wherein the applicability conditions includes variables representing objects that must be included in a pre-inclusion state and a graph pattern that semantically describes the objects that must be included in the pre-inclusion state,
   wherein the pre-inclusion state is a state against which the applicability of the component for inclusion in a processing graph is evaluated, wherein the graph pattern that semantically describes the objects that must be included in the pre-inclusion state includes triple patterns; and
   defining an inclusion effect of the component, wherein the inclusion effect includes variables representing objects that must be included in a post-inclusion state and a graph pattern that semantically describes the objects that must be in the post-inclusion state,
   wherein the post-inclusion state is a state resulting from inclusion of the component in the processing graph, wherein the graph pattern that semantically describes the objects that must be included in the post-inclusion state includes triple patterns,
   wherein the method is performed using a processor.

2. The method of claim 1, wherein the variables representing objects that must be included in a post-inclusion state include entities carried forward from a pre-inclusion state applied to the component or new entities created upon the inclusion of the component in the processing graph.

3. The method of claim 1, wherein the graph pattern that semantically describes the objects that must be in the post-inclusion state includes a triple pattern carried forward from a pre-inclusion state applied to the component or a new triple pattern created upon the inclusion of the component in the processing graph.

4. The method of claim 1, wherein when the defined applicability condition and the defined inclusion effect form a modeled component, the method further comprises:
   inputting a plurality of the modeled components;
   inputting a processing request, wherein the processing request includes a goal that is represented by a graph pattern that semantically describes a desired processing outcome; and
   assembling a processing graph that includes at least one of the components that satisfies the desired processing outcome.

5. The method of claim 4, wherein assembling the processing graph further comprises:
   identifying a pre-inclusion state of the processing graph, wherein the pre-inclusion state includes terms that represent objects included in the pre-inclusion state and a graph that semantically describes the objects in the pre-inclusion state; and
   matching the pre-inclusion state of the processing graph to an applicability condition of a first component of the plurality of modeled components if the pre-inclusion state of the processing graph includes objects that must be included in a pre-inclusion state of the first component, and if the graph that semantically describes the objects in the pre-inclusion state of the processing graph satisfies the graph pattern that semantically describes the objects that must be included in a pre-inclusion state of the first component.

6. The method of claim 5, wherein the graph that semantically describes the objects in the pre-inclusion state includes triple patterns.

7. The method of claim 5, further comprising:
   applying the pre-inclusion state of the processing graph to the first component when the pre-inclusion state of the processing graph and the applicability condition of the first component are matched to each other.

8. The method of claim 7, further comprising:
   generating a new post-inclusion state by applying differences between the inclusion effect of the first component and the applicability condition of the first component to the pre-inclusion state matched to the applicability condition of the first component based on a on a graph transformation operation.

9. The method of claim 5, wherein when the processing graph includes no component, the pre-inclusion state of the processing graph is an initial state.

10. The method of claim 5, wherein the pre-inclusion state of the processing graph that includes at least one component is a post-inclusion state of a last component included in the processing graph.

11. The method of claim 5, wherein a component with no defined applicability condition matches any state.

12. A system for modeling a component of an information processing application, comprising:
   a memory device for storing a program;
   a processor in communication with the memory device, the processor operative with the program to:
   define an applicability condition of a component, wherein the applicability conditions includes variables representing objects that must be included in a pre-inclusion state and a graph pattern that semantically describes the objects that must be included in the pre-inclusion state,
   wherein the pre-inclusion state is a state against which the applicability of the component for inclusion in a processing graph is evaluated, wherein the graph pattern that semantically describes the objects that must be included in the pre-inclusion state includes triple patterns; and define an inclusion effect of the component, wherein the inclusion effect includes variables representing objects that must be included in a post-inclusion state and a graph pattern that semantically describes the objects that must be in the post-inclusion state, wherein the post-inclusion state is a state resulting from inclusion of the component in the processing graph, wherein the graph pattern that semantically describes the objects that must be included in the post-inclusion state includes triple patterns.

13. The system of claim 12, wherein the variables representing objects that must be included in a post-inclusion state include entities carried forward from a pre-inclusion state applied to the component or new entities created upon the inclusion of the component in the processing graph.

14. The system of claim 12, wherein the graph pattern that semantically describes the objects that must be in the post-inclusion state includes a triple pattern carried forward from a pre-inclusion state applied to the component or a new triple pattern created upon the inclusion of the component in the processing graph.

15. The system of claim 12, wherein when the defined applicability condition and the defined inclusion effect form a modeled component, the processor is further operative with the program to:

receive a plurality of the modeled components;

receive a processing request, wherein the processing request includes a goal that is represented by a graph pattern that semantically describes a desired processing outcome; and assemble a processing graph that includes at least one of the components that satisfies the desired processing outcome.

16. The system of claim 15, wherein when assembling the processing graph the processor is further operative with the program to:

identify a pre-inclusion state of the processing graph, wherein the pre-inclusion state includes terms that represent objects included in the pre-inclusion state and a graph that semantically describes the objects in the pre-inclusion state; and match the pre-inclusion state of the processing graph to an applicability condition of a first component of the plurality of modeled components if the pre-inclusion state of the processing graph includes objects that must be included in a pre-inclusion state of the first component, and if the graph that semantically describes the objects in the pre-inclusion state of the processing graph satisfies the graph pattern that semantically describes the objects that must be included in a pre-inclusion state of the first component.

17. The system of claim 16, wherein the graph that semantically describes the objects in the pre-inclusion state includes triple patterns.

18. The system of claim 16, wherein the processor is further operative with the program to:

apply the pre-inclusion state of the processing graph to the first component when the pre-inclusion state of the processing graph and the applicability condition of the first component are matched to each other.

19. The system of claim 18, wherein the processor is further operative with the program to:

generate a new post-inclusion state by applying differences between the inclusion effect of the first component and the applicability condition of the first component to the pre-inclusion state matched to the applicability condition of the first component based on a on a graph transformation operation.

20. The system of claim 16, wherein when the processing graph includes no component, the pre-inclusion state of the processing graph is an initial state.

21. The system of claim 16, wherein the pre-inclusion state of the processing graph that includes at least one component is a post-inclusion state of a last component included in the processing graph.

22. The system of claim 16, wherein a component with no defined applicability condition matches any state.

23. A computer program product comprising a non-transitory computer useable medium having computer program logic recorded thereon for modeling a component of an information processing application, the computer program logic comprising:

program code for defining an applicability condition of a component, wherein the applicability conditions includes variables representing objects that must be included in a pre-inclusion state and a graph pattern that semantically describes the objects that must be included in the pre-inclusion state, wherein the pre-inclusion state is a state against which the applicability of the component for inclusion in a processing graph is evaluated, wherein the graph pattern that semantically describes the objects that must be included in the pre-inclusion state includes triple patterns; and program code for defining an inclusion effect of the component, wherein the inclusion effect includes variables representing objects that must be included in a post-inclusion state and a graph pattern that semantically describes the objects that must be in the post-inclusion state, wherein the post-inclusion state is a state resulting from inclusion of the component in the processing graph, wherein the graph pattern that semantically describes the objects that must be included in the post-inclusion state includes triple patterns.

* * * * *